United States Patent
Hickey et al.

(10) Patent No.: US 8,886,699 B2
(45) Date of Patent: Nov. 11, 2014

(54) OFFLOADING THE PROCESSING OF SIGNALS

(75) Inventors: John Hickey, Ratoath (IE); Jerome Nolan, Dublin (IE); Peter Shelley, Ballykeeffe (IE)

(73) Assignee: Cloudium Systems Limited, Limerick (IE)

( * ) Notice: Subject to any disclaimer, the term of this patent is extended or adjusted under 35 U.S.C. 154(b) by 300 days.

(21) Appl. No.: 13/011,323

(22) Filed: Jan. 21, 2011

(65) Prior Publication Data

US 2012/0191768 A1    Jul. 26, 2012

(51) Int. Cl.
 *G06F 15/16* (2006.01)
 *G06F 9/50* (2006.01)

(52) U.S. Cl.
 CPC .................... *G06F 9/5027* (2013.01)
 USPC .......................................................... 709/201

(58) Field of Classification Search
 USPC .................................. 709/201, 204
 See application file for complete search history.

(56) References Cited

U.S. PATENT DOCUMENTS

| | | | |
|---|---|---|---|
| 5,917,502 A * | 6/1999 | Kirkland et al. | 345/505 |
| 5,995,490 A | 11/1999 | Shaffer et al. | |
| 6,275,867 B1 | 8/2001 | Bendert et al. | |
| 6,470,380 B1 | 10/2002 | Yoshizawa et al. | |
| 6,657,625 B1 | 12/2003 | Chik et al. | |
| 7,181,544 B2 | 2/2007 | Vangal et al. | |
| 7,224,692 B2 | 5/2007 | Fan | |
| 7,259,758 B2 | 8/2007 | Yee | |
| 7,400,274 B2 * | 7/2008 | Fallon et al. | 341/51 |
| 7,403,542 B1 | 7/2008 | Thompson | |
| 7,418,472 B2 * | 8/2008 | Shoemaker et al. | 709/203 |
| 7,424,710 B1 | 9/2008 | Nelson et al. | |
| 7,460,725 B2 | 12/2008 | Malladi et al. | |
| 7,472,311 B1 | 12/2008 | Chu et al. | |
| 7,502,324 B1 | 3/2009 | Tieu | |
| 7,516,255 B1 | 4/2009 | Hobbs | |
| 7,554,917 B1 | 6/2009 | Tieu | |
| 7,701,915 B2 | 4/2010 | Curcio et al. | |
| 7,716,358 B2 * | 5/2010 | Price | 709/231 |
| 7,783,987 B2 * | 8/2010 | Nguyen | 715/780 |
| 7,899,864 B2 * | 3/2011 | Margulis | 709/204 |
| 8,170,123 B1 * | 5/2012 | Hobgood et al. | 375/240.26 |
| 8,171,154 B2 * | 5/2012 | Vonog et al. | 709/232 |
| 8,572,251 B2 * | 10/2013 | Srinivas et al. | 709/226 |
| 8,756,660 B2 * | 6/2014 | Malakapalli et al. | 726/4 |

(Continued)

FOREIGN PATENT DOCUMENTS

EP    1788773 A1    5/2007

OTHER PUBLICATIONS

Spanias, Andrew et al., Development and Evaluation of a Web-Based Signal and Speech Processing Laboratory for Distance Learning, 2000, p. 1-4.*

(Continued)

*Primary Examiner* — Lisa Lewis
*Assistant Examiner* — Olanrewaju Bucknor
(74) *Attorney, Agent, or Firm* — Brown Rudnick LLP (57) ABSTRACT

A server computer that is connected over a network to one or more remote client computers includes specialized hardware for handling computationally-intensive signal processing operations involving video, audio, and/or other signals. As a result, users of the client computers experience little or no delay when accessing over the network applications that are hosted on the server.

15 Claims, 7 Drawing Sheets

(56) References Cited

U.S. PATENT DOCUMENTS

| | | | |
|---|---|---|---|
| 2001/0026319 A1 | 10/2001 | Honey et al. | |
| 2002/0186660 A1 | 12/2002 | Bahadiroglu | |
| 2003/0033352 A1 | 2/2003 | Stringham | |
| 2003/0079016 A1* | 4/2003 | Tsao | 709/226 |
| 2005/0165617 A1 | 7/2005 | Patterson et al. | |
| 2006/0242710 A1* | 10/2006 | Alexander | 726/24 |
| 2007/0009029 A1 | 1/2007 | Craig et al. | |
| 2007/0217623 A1 | 9/2007 | Harada | |
| 2007/0247470 A1 | 10/2007 | Dhuey et al. | |
| 2008/0195703 A1* | 8/2008 | Salesky et al. | 709/204 |
| 2009/0002380 A1* | 1/2009 | Langyel et al. | 345/522 |
| 2009/0220002 A1 | 9/2009 | Laan et al. | |
| 2010/0014777 A1 | 1/2010 | Bruton et al. | |
| 2010/0045682 A1* | 2/2010 | Ford et al. | 345/502 |
| 2010/0246982 A1* | 9/2010 | Petrov | 382/232 |
| 2011/0222556 A1 | 9/2011 | Shefler et al. | |
| 2012/0082395 A1* | 4/2012 | Abdo | 382/239 |

OTHER PUBLICATIONS

Schmidt Douglas C, A Family of Design Patterns for Application-Level Gateways, Dec. 1996, Theory and Practice of Object Systems, special issue on Patterns and Pattern Languages, Wiley & Sons, vol. 2, No. 1, p. 1-16.*
Trees Van HL, Detection and Estimation Theory, 1968, p. 1-30.*
International Search Report and Written Opinion in PCT/IB2012/000741, mailed Jul. 25, 2012.
Remote Desktop Protocol: Basic Connectivity and Graphics Remoting Specification, Microsoft Corporation, Nov. 12, 2010 (417 pages).
International Search Report and Written Opinion in PCT/IB2011/003277, mailed Apr. 26, 2012, 9 pages.
International Preliminary Report on Patentability for PCT/IB2012/000741, Aug. 1, 2013 (6 pages).

* cited by examiner

OFFLOADING THE PROCESSING OF SIGNALS

TECHNICAL FIELD

The invention relates to processing video and/or other signals faster within a server system in order to improve the experience of a user accessing the server system over a network with a remote client computer.

BACKGROUND INFORMATION

In the past, time-shared computers, also known as mainframe computers, allowed a large number of users to interact concurrently with a single computer through the use of remotely located user terminals. The next wave of computing saw individual computers, also known as personal computers move onto a user's desktop. Over time, personal computers became more powerful than the centralized mainframe computers. However, over the last five to ten years, the computing industry has seen the deconstruction of personal computers into individual components of storage, processors, and user-interfaces, where each of these components are combinable in different ways. More recently, a growing trend has been to shift back to a centralized computing model with a processor and storage located in a data center, and a user interface extended out to the desktop for the user. The benefits of centralization in this model include reduced cost, increased security, reduced operational expense, increased resilience, and increased performance.

Microsoft Corporation's Remote Desktop Protocol (RDP) is a protocol which allows a user's local computer to interact across a network with a server system by transferring graphics display information from the server(s) to the user's local display and also transporting input from the user to the server(s). RDP allows for specialized software processing and communication between components on the user's computer and components running on the server(s). For example, if a server computer processes a 1920×1200 video running at 30 frames per second (fps), which would otherwise result in about 1.7 Gigabits per second (Gbps) of video data being transferred to memory within the server, RDP will compress the data down to about 1 Mbps (megabits per second) to 30 Mbps and thereby reduce the amount of data that needs to be written into system memory within the server. Even with this compression performed in software by RDP, there still are significant performance costs (in, for example, bandwidth, power, and latency), particularly when many users are sharing the resources of the server(s) as is typically the case.

SUMMARY OF THE INVENTION

The invention relates to offloading, to one or more specialized electronic hardware components, the processing of video, audio, and/or USB (Universal Serial Bus) peripheral signals in order to optimize the experience of a user at a local client computer when connected over a network to a remote server system. Video in particular can be very expensive to transfer between client and server computers, in terms of at least bandwidth and latency. The overall experience of users at client computers can be enhanced when servers are able to perform better and faster by offloading certain signal processing tasks to one or more specialized signal processing hardware components. Specialized hardware according to the invention is designed to work with any server computer as well as software utilized by server computers such as Microsoft's RDP. The inventive hardware cooperates with the server's existing processor(s) and memory to offload from the server's processor(s) and memory computationally demanding and intensive tasks such as the compression of video signals. This allows the tasks to be done faster on the server which in turn improves the experience of a user accessing the server over a network with a remote client computer.

In one aspect, the invention generally relates to a method of offloading the processing of one or more signals such as video, audio, and/or other signals. The method is executed by one or more server computers connected via a communications network to one or more client computing devices. The method includes receiving, over the communications network, one or more requests associated with one or more signals, transmitting the one or more signals to specialized signal processing hardware associated with the server computer, receiving one or more tokens from the signal processing electronics in response to the transmitted one or more signals, storing the one or more tokens, and requesting the signal processing electronics to process the one or more requests by passing the one or more stored tokens to the signal processing electronics.

Embodiments according to this aspect of the invention can include a variety of features. For example, the one or more requests can involve processing of video, audio, and/or other signals. And the processing can be compression, encoding, decoding, and/or encryption, for example. The one or more server computers can execute a remote access protocol such as Microsoft Corporation's Remote Desktop Protocol (RDP).

In another aspect, the invention generally relates to a server computer that performs the above-described method.

These and other aspects, features, objects, and advantages of the invention will become apparent with reference to the following description, the accompanying drawings, and the claims. Furthermore, it is to be understood that the features and the various embodiments described herein are not mutually exclusive and can exist in various combinations and permutations whether or not expressly set forth.

BRIEF DESCRIPTION OF THE DRAWINGS

In the drawings, like reference characters generally refer to the same or similar parts throughout the different views. Also, the drawings are not necessarily to scale, emphasis instead generally being placed upon illustrating the principles of the invention(s).

DESCRIPTION

The invention generally relates to offloading the processing of video signals (and/or other signals such as audio signals and/or USB peripheral signals) in order to optimize the experience of a user at a client computer that is communicating with a server computer over a communications network, such as an intranet or the Internet. By offloading to specialized hardware some or all of the more compute-intensive signal processing tasks required of the server computer and that the server computer otherwise would perform in software using its main processor(s) and system memory, the server computer is able to provide the user at the client computer with reduced delays and an experience that is as close as possible to the user's experience when his or her client computer is running all applications locally on the client computer and not accessing them remotely over the network from the server computer.

Figure 1:
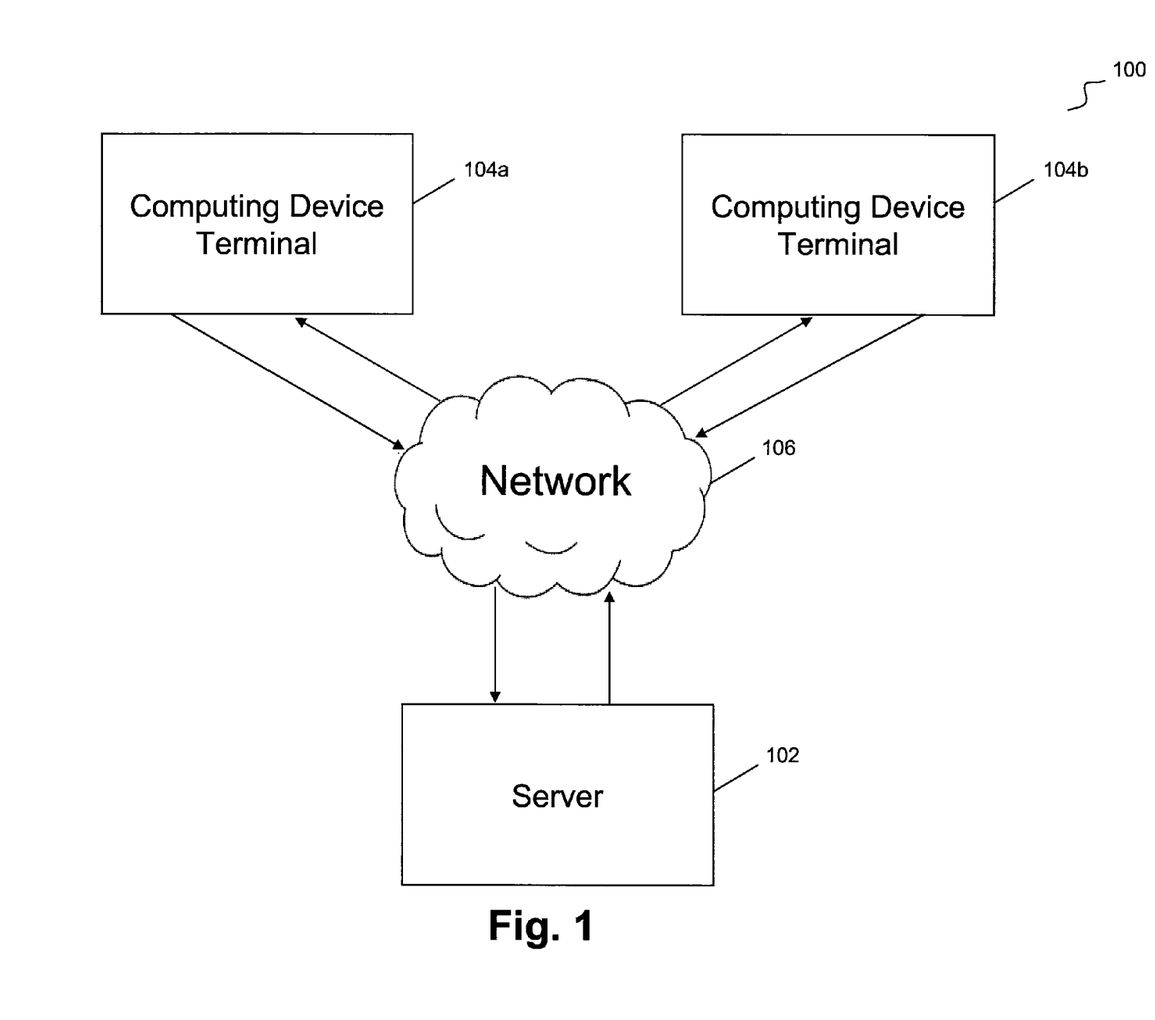
FIG. 1 is a block diagram of a system with a server and various computing device terminals depicted communicating over a communications network.

Referring to FIG. 1, in one embodiment according to the invention, a system 100 includes a server 102, two or more computing device terminals 104a, 104b, and a communications network 106. Each of the computing device terminals 104a, 104b is wired or wirelessly connected to the network 106. In addition, each of the computing device terminals 104a, 104b is configured to transmit and receive data over the network 106. The server 102 is also wired or wirelessly connected to the network 106. The system 100 generally includes software such as an operating system running on each of the computers (102, 104a, 104b, etc.), and each of the computers can have the same or a different operating system. Possible operating systems include any version of Microsoft's operating system, any version of the Linux operating system, and any version of Apple's operating system. Each operating system typically will support Microsoft Corporation's RDP or some other remote access protocol.

Figure 2A:
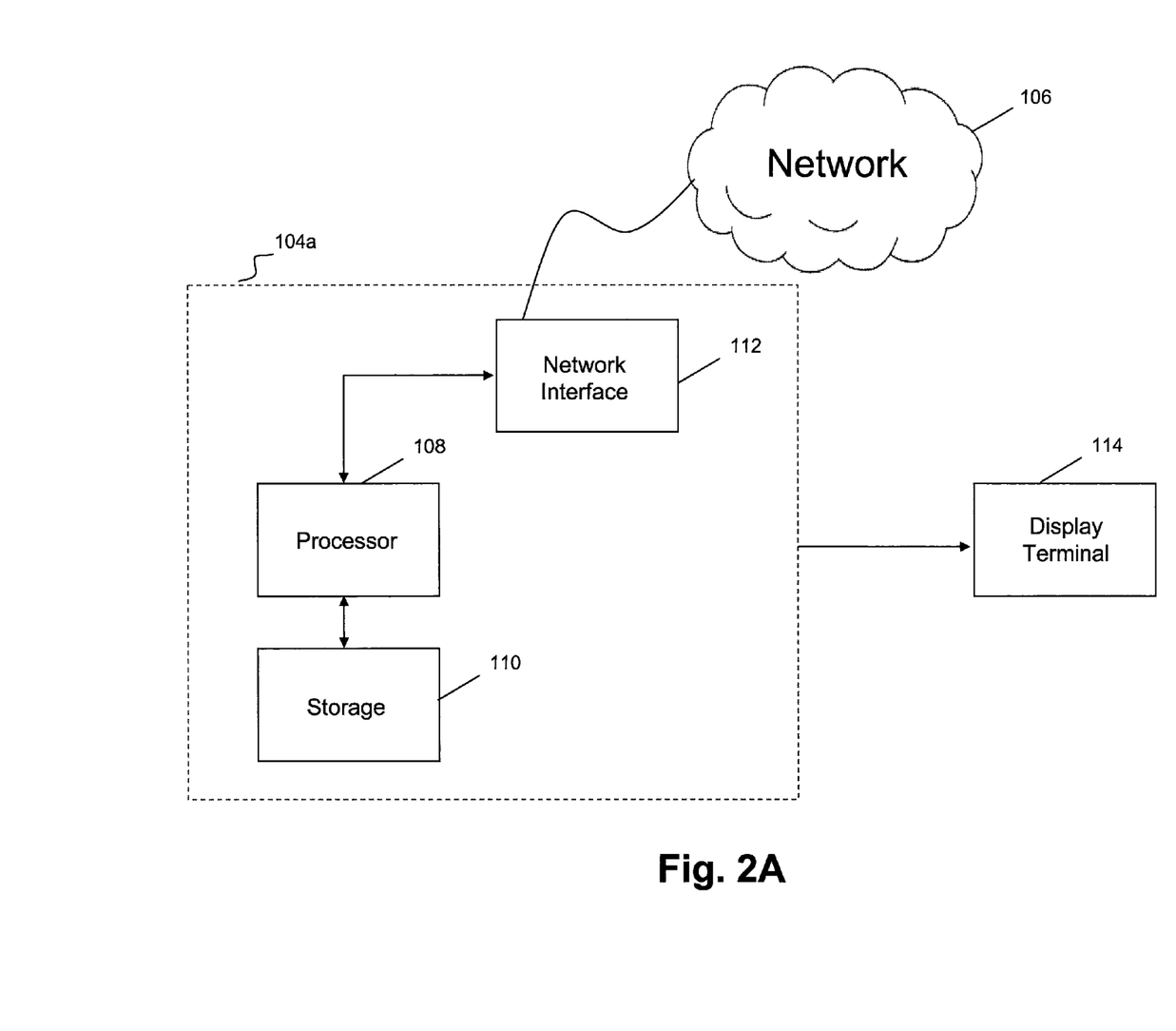
FIG. 2A is a block diagram of various components of a computing device terminal of FIG. 1 in communication with the communications network.

Referring to FIG. 2A, the system 100 is not limited to a minimum or maximum number of computing device terminals 104a, 104b. There could be one, two, three, etc. of these computing device terminals. The computing device terminals 104a, 104b can be general-purpose client computers such as laptops, desktops, tablets, etc., and as such each of these terminals typically will include a processor 108, storage 110, a network interface 112, and a display terminal 114. The display terminal 114 can be a cathode ray tube (CRT) display device, a flat screen display device, or any other type of display device that can be viewed by a user of any of the client terminals 104a, 104b. The processor 108 is a central processing unit (CPU) that typically comprises a single microprocessor but can comprise two or more cooperating microprocessors, and in any event the processor 108 is operatively coupled to the storage 110 and the network interface 112. The storage 110 includes instructions which, when executed by the processor 108, cause the processor 108 at least to display a video signal on the display terminal 114. Each of these computing device terminals 104a, 104b typically will include a variety of software programs including an operating system, an Internet browser, and other applications. Each of these computing device terminals also typically will include various peripheral devices such as a keyboard and a mouse or other pointing device.

Figure 2B:
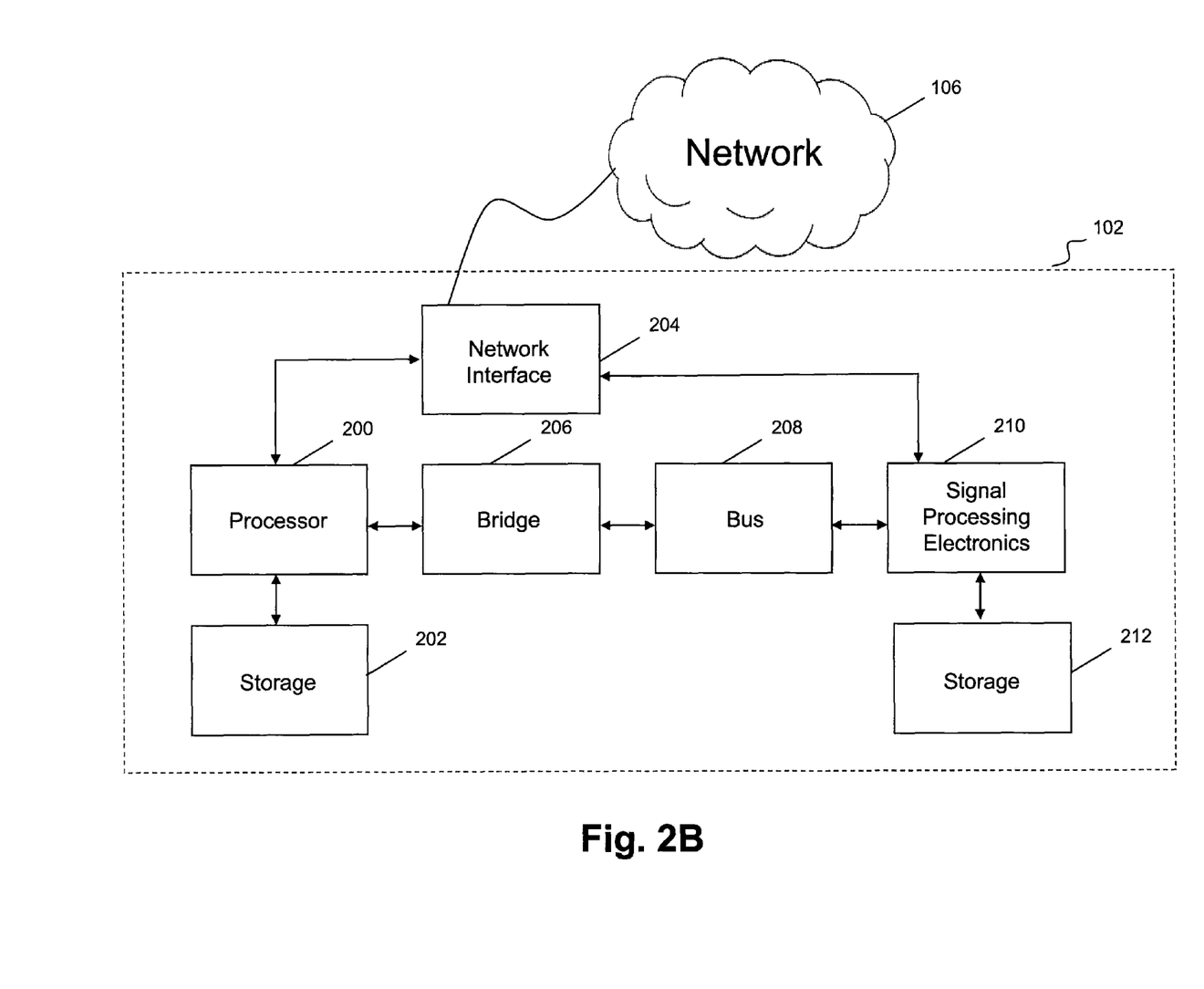
FIG. 2B is a block diagram of various components of the server of FIG. 1 in communication with the communications network.

Referring to FIGS. 2A and 2B, the server 102 can be a general-purpose computer like the terminals 104a, 104b described herein but more typically will be one or more dedicated computers such as file servers, print servers, database servers, application servers, and/or web servers. As such, the server 102 typically will include a processor 200, storage 202, and one or more network interfaces 204. In accordance with the invention, the server 102 also includes a bridge 206, a bus 208, specialized signal processing electronics 210, and storage 212 associated specifically with the electronics 210. The processor 200 of the server 102 is a CPU that can comprise a single microprocessor but more typically comprises a multiprocessor. In any event, the processor 200, whatever its architecture, is operatively coupled to the storage 202 and, in one embodiment, the network interface 204. The storage 202 includes instructions which, when executed by the processor 200, cause the processor 200 to perform a variety of functions.

Each of the network interfaces 112, 204 is operatively coupled to the network 106 via a connection. The connection can be an Ethernet cable. In other embodiments, the connection can be a coaxial or fiber optic cable. In yet other embodiments, the connection can be a wireless link or connection such as, for example, a cellular link or a Wi-Fi link. The network 106 can be, for example the Internet, a dedicated communications network, an intranet, a cellular network, or any other network capable of effecting communication between the server 102 and each of the computing device terminals 104a and 104b.

The processor 200 is in communication with the signal processing electronics 210 via the bridge 206 and the bus 208. The signal processing electronics 210 can include an encoder/decoder component and other processing components. The bridge 206 can be, for example, a peripheral component interconnect express component (PCI Express or PCIe). The bus 208 can be, for example, a conventional peripheral component interconnect bus (Conventional PCI bus) or a peripheral component interconnect express bus (PCIe Bus). The signal processing electronics 210 is operatively coupled to the storage 212, and in one embodiment also to the network interface 204.

The storage 110, storage 202, and storage 212 is any physical computer-readable media such as one or more of magnetic storage media, optical storage media, magneto-optical storage media, read-only memory ("ROM"), random-access memory ("RAM"), and flash memory devices. Magnetic storage media may be hard disks, floppy disks, and magnetic tape. Optical storage media may be Compact Disc/Digital Video Discs ("CD/DVDs"), Compact Disc-Read Only Memories ("CD-ROMs"), and holographic devices.

A network protocol is in communication with the processor 200 via the network interface 204, and/or it is in communication with the signal processing electronics 210 via the network interface 204. In any event, the network protocol may be Microsoft Coporation's RDP or some other remote access protocol. The system 100 is configured to transmit video, audio, and other signals (such as USB-based peripheral traffic) across the network 106 to the computing device terminal 104a and/or the computing device terminal 104b via the network interface 204. In order to increase performance of the system 100, the signal processing electronics 210 is configured as one or more specialized and/or dedicated hardware components for handling exclusively certain processes that are offloaded by the processor 200 and that otherwise would be executed more slowly in software by the processor 200. The signal processing electronics 210 performs in hardware computationally-intensive tasks which would otherwise be performed in software by the processor 200. The compute-intensive tasks can include, for example, compression of audio and video signals, encoding and decoding audio and video signals, bulk compression of audio, video, and other signals (such as signals from USB peripherals), and encryption of signals for transmission across the network 106.

The signal processing electronics 210 thus can be considered a hardware accelerator, and it, together with at least its associated accelerator storage 212, can be incorporated onto a physical card or circuit board that can be communicatively connected to the processor 200 of the server 102 (by, for example, the bus 208). Alternatively, at least the signal processing electronics 210 and its storage 212 can be realized as one or more integrated circuits (ICs) that can be incorporated into the motherboard of the server 102 and thereby communicatively connected to the processor 200. In any case, at least the signal processing electronics 210 and its storage 212 are, in accordance with a preferred embodiment of the invention, physical electronic hardware that are specialized and dedicated to processing very fast and efficiently various computationally-intensive signal processing type operations that otherwise would be handled more slowly and less efficiently in software by the existing general-purpose processor 200 of the server 102.

As indicated by one of the communication arrows in FIG. 2B and as indicated elsewhere herein, the signal processing electronics 210 can communicate over the network 106 via the network interface 204. In some embodiments, both the signal processing electronics 210 and the processor 200 communicate over the network 106 via the network interface 204, or else just one of the signal processing electronics 210 and the processor 200 communicates over the network 106 via the network interface 204. Also, while just a single box is shown as the network interface 204 in FIG. 2B, it is possible and within the scope of this description that each of the signal processing electronics 210 and the processor 200 has its own separate and distinct network interface 204. In a preferred embodiment according to the invention, the maximum benefits of the token-based scheme described herein are achieved when the signal processing electronics 210 is able to communicate over the network 106 directly via either a shared or a dedicated network interface 204.

Figure 3:
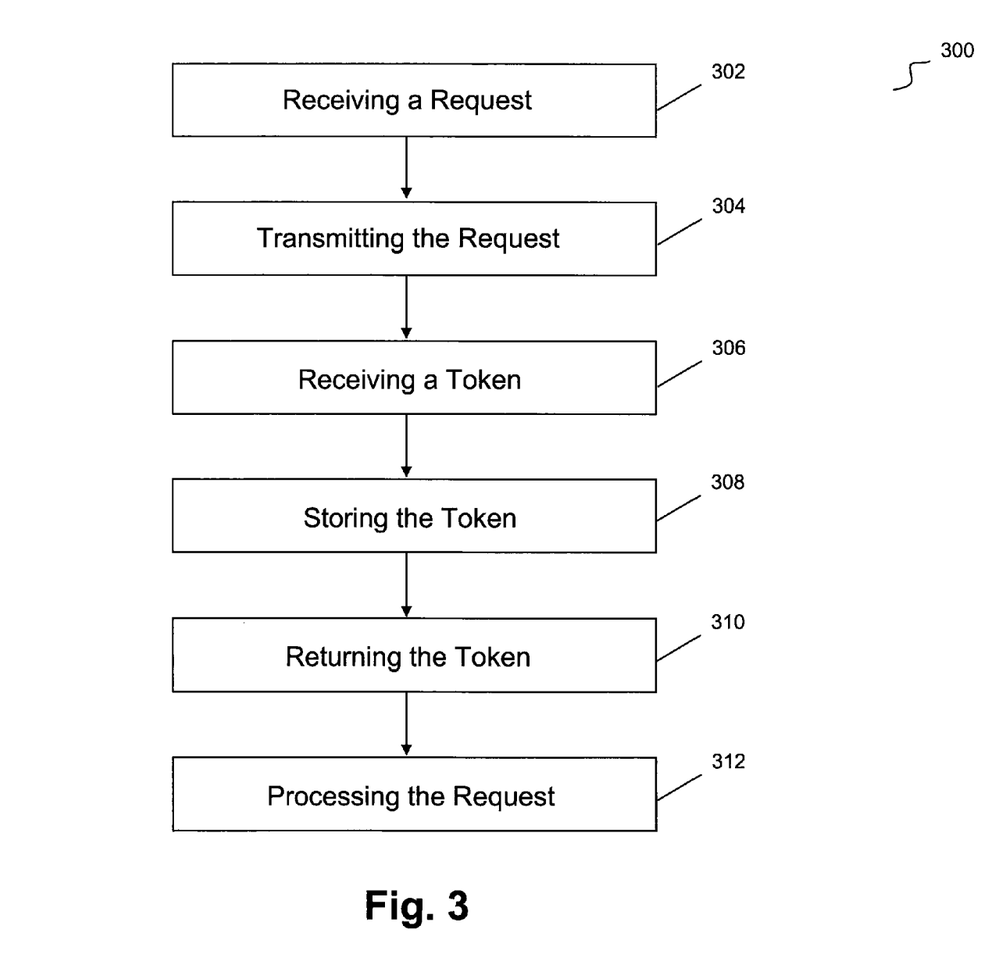
FIG. 3 is a flowchart of offloading the processing of one or more video signals.

Referring to FIG. 3, a method 300 of offloading the processing of one or more video (and/or other) signals, which is executed by a server computer, includes the following steps: receiving a request 302, transmitting the request 304, receiving a token 306, storing the token 308, returning the token 310, and processing the request 312. In operation, one of the terminals 104a, 104b of the system 100 sends a request to the server 102 via the network 106 for a video signal. The terminal 104a, 104b can display the video signal on its display terminal 114 once the video signal is received over the network 106 from the server 102. The request for the video signal is received at the server 102 (step 302). And, in response to the received request, the processor 200 transmits the video signal to the signal processing electronics 210 for compression (and/or one or more other computationally-intensive signal processing operations) prior to sending the video signal across the network 106 (step 304). The signal processing electronics 210 then stores in the storage 212 the video signal transmitted to it by the processor 200. The signal processing electronics 210 creates a unique token for each separate video signal stored in the storage 212. This token acts as a place-holder for the actual signal/data (whether video, audio, etc.) kept in the storage 212. Each of these tokens may be, for example, a 4-byte data packet. The token is then transmitted from the signal processing electronics 210 to the processor 200 for storing in the storage 202 (step 306). The token is stored in the storage 202 at step 308. The signal processing electronics 210 maintains a mapping between each token transmitted and stored in the storage 202 and each video signal stored in the storage 212. The processor 200 can subsequently request the signal processing electronics 210 to process the video signal by retrieving the token from the storage 202 and transmitting the token back to the signal processing electronics 210 (step 310). In response to receiving the token, the signal processing electronics 210 associates the token with the stored video signal and performs the requested function (e.g., compression of the video signal for transmission across the network 106) at step 312.

In this manner, a high volume of requests for video signals can be received and processed by the server 102 without causing unacceptable latency between the server 102 and the computing device terminals 104a, 104b. This operation can take place several times during a particular session for users of the computing device terminals 104a, 104b.

This inventive token-based scheme that is used in connection with the specialized signal processing hardware described herein can result in data traffic within the server 102 being reduced by a factor of about sixty as compared to the conventional software-based handling of data according to RDP. After a token is established according to the inventive token-based scheme, all future steps of the RDP (or any other remote access protocol) involving the data represented by that token do not require the actual represented data to be transformed (for example, compressed) except by the highly efficient and specialized signal processing electronics 210. If encoded video needs to be compressed or sent out over the network 106, for example, only the one or more tokens are sent back to the signal processing electronics 210 by the processor 200, and then the signal processing electronics 210 uses the token(s) to locate the actual data in the storage 212 and then process that data in hardware as required (for example, encoding it, compressing it, encrypting it, sending it out over the network 106, etc.). As already indicated, the signal processing electronics 210 maintains a one-to-one mapping between the actual data held in the storage 212 and the related token that is passed back to the RDP (or other remote access protocol) stack being executed by the processor 200, and thus there is a unique relationship between each token and its corresponding actual data.

Also, it is noted that the inventive token-based scheme described herein allows hardware offloading (to the signal processing electronics 210) to occur for any given network protocol without that protocol being aware of, concerned with, or involved with the offloading to the specialized signal processing hardware. It is the use of tokens that allows any given network protocol to operate as usual and without any awareness of or involvement with the hardware offloading. Whatever network protocol is being used (such as Microsoft's RDP in the preferred embodiment according to the invention), that protocol is unaware of the existence of the signal processing electronics 210 and also is unaware of the mapping that is done by the signal processing electronics 210 to relate a particular token to its associated data held in the storage 212. In the preferred embodiment, when RDP wants to send compressed video data across the network, RDP simply performs all of the same functions that it would if the offloading signal processing electronics 210 were not present. That is, the RDP stack is not aware of or involved with any of the swapping of tokens for actual data. This swapping function is a function that the signal processing electronics 210 handles when it receives a token from the processor 200 in conjunction with, for example, an operation where the RDP is sending compressed video data out across the network 106 via the network interface 204.

Figure 4:
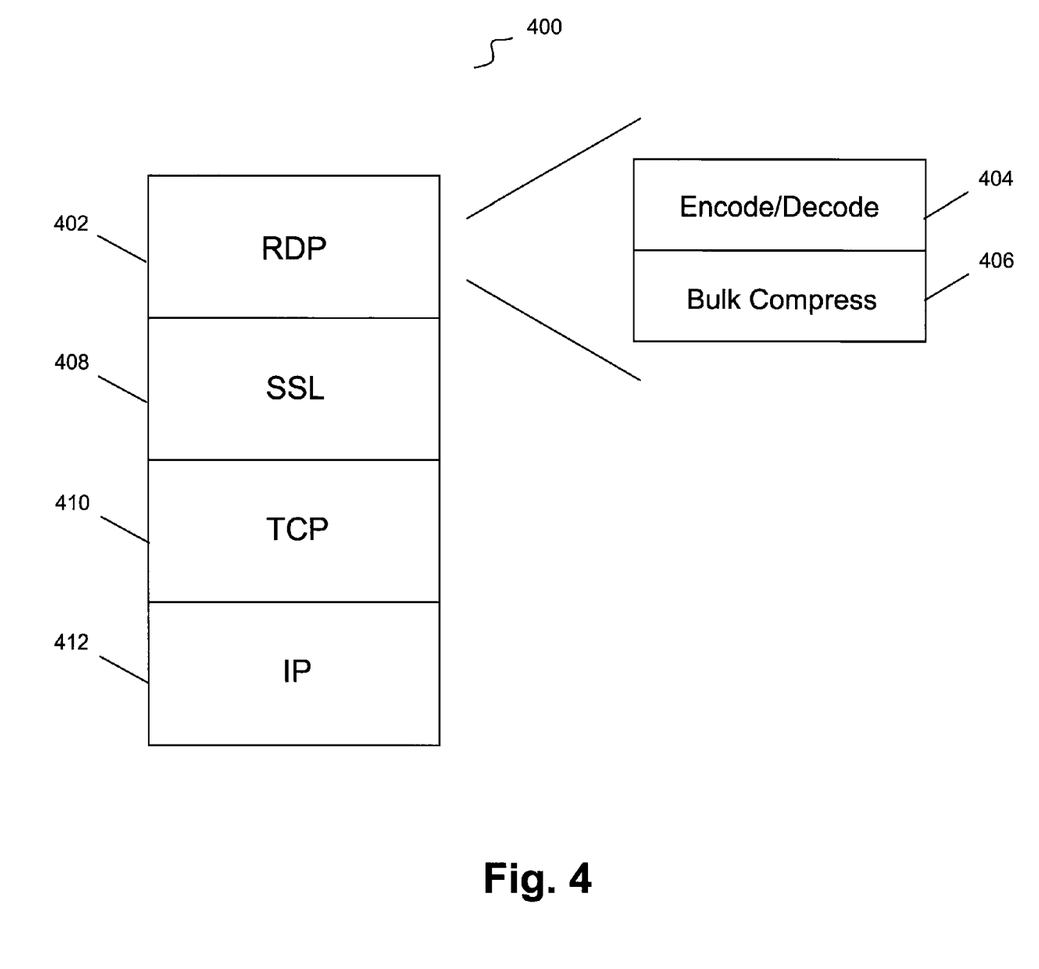
FIG. 4 is a block diagram of a protocol stack.

Referring to FIG. 4, an implementation of a protocol stack 400 in the networking protocol suite of the system 100 can be configured in several manners. In one embodiment, the network protocol 402 utilizes the Remote Desktop Protocol (RDP) by Microsoft Corporation and is the top level of the protocol stack 400. The network protocol 402 can be configured to be in communication with application programming interfaces (APIs) or other software drivers to allow the signal processing electronics 210 to perform computationally intensive tasks, such as encoding or decoding the video signals 404 or bulk compression of audio, video, and/or other signals 406. Other layers of the protocol stack 400 include the application layer 408 (secure socket layers (SSL)), the transport layer 410 (transmission control protocol (TCP)), and the Internet layer 412 (Internet Protocol (IP)) for the transmission of data across the network 106. This process takes advantage of optimizing across layers of the protocol stack 400 rather than treating each layer separately.

Figure 5:
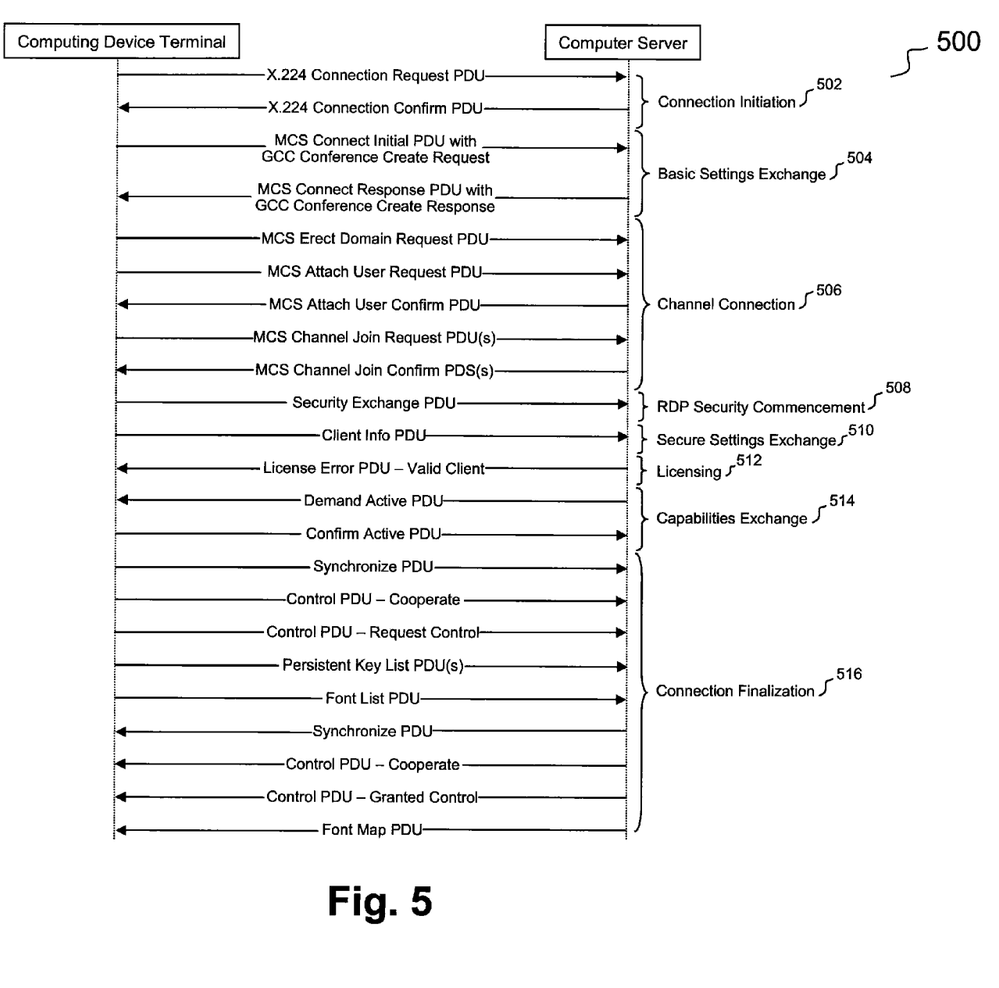
FIG. 5 is a diagram of a protocol sequence to establish connection between the server and the computing device terminals of FIG. 1.

Referring to FIG. 5, a protocol sequence 500 to establish communication between the computing device terminals 104a, 104b and the server 102 can include several steps. The protocol sequence 500 typically is not a computationally intensive process and as such it may run on the processor 200 of the server 102 and not be offloaded to the signal processing electronics 210. The steps of the protocol sequence 500 between the computing device terminals 104a, 104b and the server at step 502 can include: initiating a connection at step 502, exchanging basic settings at step 504, establishing a channel connection at step 506, commencing security of the network protocol at step 508, exchanging secure settings at step 510, confirming appropriate licenses at step 512, exchanging capabilities at step 514, and finalizing the connection at step 516. Once the connection has been established at step 516, video, audio and USB peripheral traffic can be transferred between the computing device terminals 104a, 104b and the server 102.

Referring to FIGS. 1, 2A, 2B, 3, 4, and 5, once the protocol sequence 500 has been established, a series of session identifications (ID) can be used to track individual user sessions on each of the computing device terminals 104a, 104b. In this manner, the signal processing electronics 210 can take over the operation of the protocol sequence 500 from the protocol stack 400. If an error occurs once the protocol sequence 500 is established, the signal processing electronics 210 can hand back control of the protocol sequence 500 to the protocol stack 400 with session status information such that the protocol stack 400 can seamlessly take back control.

In the case of Virtual Desktop Infrastructure (VDI), the process of allowing the network protocol to offload the processing of one or more video signals can be shared by many computing devices by using standard hardware device virtualization techniques. In this case, the use of tokens rather than the transmission of the actual data to move through the protocol sequence 500 is increased due to the extra overhead virtualization places on the movement of data within the server 102.

Figure 6:
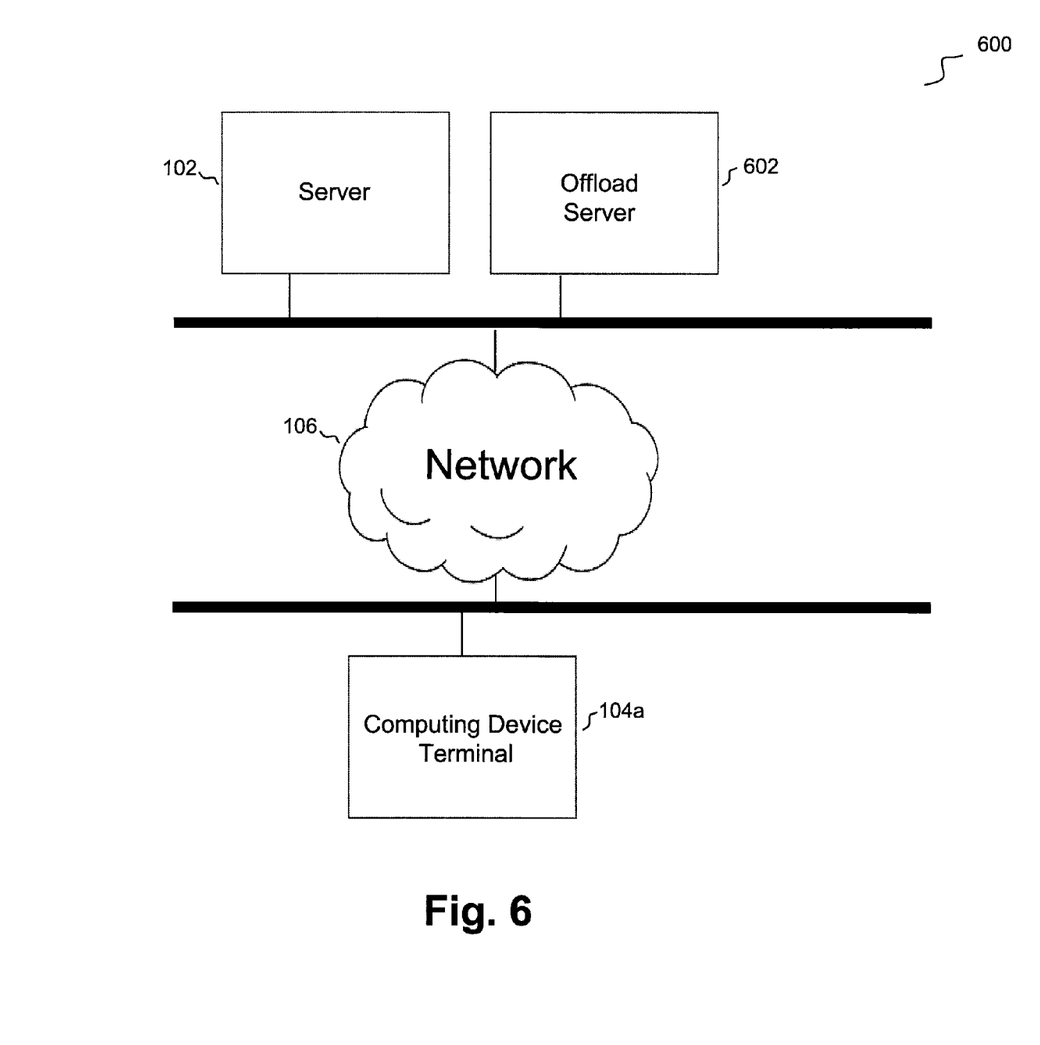
FIG. 6 is a block diagram of another embodiment of the system of FIG. 1.

Referring to FIG. 6, in another embodiment according to this aspect of the invention, a system 600 includes a server 102, an offload server 602, a computing device terminal 104a, and a communications network 106. In contrast to the system 100 of FIGS. 1, 2, 3, 4, and 5, the system 600 includes non-Microsoft operating protocols and systems, such as Linux® and Apple® based systems. In operation, the server 102 is a non-Microsoft server that transmits sequenced audio, video, and USB signals to the offload server 602. The protocol between the server 102 and the offload server 602 can use a Remote Direct Memory Access (RDMA) like mechanism such that the data from the server 102 is transmitted without software intervention. This mechanism can reduce the protocol processing overhead which is beneficial on the server 102. Alternatively, this can also be achieved by taking the raw audio, video, or USB outputs from the server 102 and bundling it for processing by the offload server 602. The offload server 602 analyzes the sequenced signals and processes the signals for transmission as does the RDP network protocol of FIGS. 4 and 5. The offload server 602 transmits the signals to the computing device terminal 104a via the communications network 106. In operation, the process of requesting and processing tokens operates as does the processes of the system 100.

It will be understood that various modifications may be made to the embodiments disclosed herein. Therefore, the above description should not be construed as limiting, but merely as illustrative of some embodiments according to the invention.

What is claimed is:

1. A method of offloading signal processing within a server computer, the method executed by the server computer which comprises a processor, first storage associated with the processor, signal processing electronics, and second storage associated with the signal processing electronics, the processor in communication with the signal processing electronics over an internal communications bus within the server, the method comprising:
    receiving at the server computer a request over a communication network from a client computing device, the request associated with a signal;
    offloading signal from the server's processor to the server's signal processing electronics using the internal communications bus;
    storing the offloaded signal in the server's second storage;
    generating with the signal processing electronics a token unique to the offloaded signal;
    using the token instead of the offloaded signal during network protocol operations;
    receiving, by the processor and over the internal communications bus, the token from the signal processing electronics;
    storing the received token in the server's first storage;
    requesting, by the processor and during performance of a network protocol step, the signal processing electronics to process the offloaded signal by passing, across the internal communication bus to the signal processing electronics, the token stored in the first storage;
    associating, by the signal processing electronics, the passed token with its offloaded signal stored in the second storage; and
    processing the offloaded signal with the signal processing electronics.

2. The method of claim 1 wherein the request involves compression of a video signal.

3. The method of claim 1 wherein the request involves compression of an audio signal.

4. The method of claim 1 wherein the request involves encoding a video signal.

5. The method of claim 1 wherein the request involves decoding a video signal.

6. The method of claim 1 wherein the request involves bulk compression of a video signal.

7. The method of claim 1 wherein the request involves encrypting a video signal.

8. The method of claim 1 wherein the network protocol step is a remote access protocol step.

9. A server computer, comprising:
    a processor;
    first storage associated with the processor;
    signal processing electronics in communication with the processor over an internal communication bus within the server; and
    second storage associated with the signal processing electronics,
    the server configured to:

receive, at the server computer a request from a client computing device connected to the server computer over a communications network, the request associated with a video signal, offload the video signal from the server's processor to the to the server's signal processing electronics using the internal communication bus, store the offloaded video signal in the server's second storage, generate with the signal processing electronics a token unique to the offloaded video signal;

use the token instead of the offloaded video signal during network protocol operations;

receive, by the processor and over the internal communication bus, the token from the signal processing electronics, store the token in the server's first storage, request, by the processor and during performance of a network protocol step, the signal processing electronics to process the offloaded signal by passing, across the internal communication bus to the signal processing electronics, the token stored in the first storage, associate, by the signal processing electronics, the passed token with its offloaded video signal stored in the second storage, and process the offloaded video signal with the signal processing electronics.

10. The server computer of claim 9 wherein the request involves compression of the video signal.

11. The server computer of claim 9 wherein the request involves encoding the video signal.

12. The server computer of claim 9 wherein the request involves decoding the video signal.

13. The server computer of claim 9 wherein the request involves bulk compression of the video signal.

14. The server computer of claim 9 wherein the request involves encrypting the video signal.

15. The server computer of claim 9, wherein the network protocol step is a remote desktop protocol step.

* * * * *